United States Patent [19]

Young

[11] 4,028,662

[45] June 7, 1977

[54] PASSING VEHICLE SIGNALLING APPARATUS

[76] Inventor: Raymond Donald Young, High St., Meredith, N.H. 03253

[22] Filed: May 24, 1976

[21] Appl. No.: 689,496

[52] U.S. Cl. .................................. 340/32; 340/1 T; 343/7 VM
[51] Int. Cl.² .................... G08G 1/00; G01S 9/66
[58] Field of Search ............... 340/32, 33, 1 T; 343/7 VM

[56] References Cited

UNITED STATES PATENTS

| | | | |
|---|---|---|---|
| 3,052,882 | 9/1962 | Pidhayny | 340/33 |
| 3,842,397 | 10/1974 | Sindle | 340/32 |
| 3,892,483 | 7/1975 | Saufferer | 340/33 |

Primary Examiner—Thomas B. Habecker
Attorney, Agent, or Firm—Robert D. Farkas

[57] ABSTRACT

This disclosure pertains to a signaling apparatus installed within a movable large vehicle, such as a truck. Two sensing heads are utilized by mounting one of each on the frontmost opposed sides of the vehicle. Each sensor is manually selectively energized so as to detect the distance separating a vehicle being passed from the equipped vehicle on the side of the energized sensor. The sensors may utilize sound, radio or light waves to operate a conventional range detecting apparatus. A comparetor circuit compares the range of the vehicle being scrutinized with the range manually predetermined by setting a minimum range control element. A warning light continues to indicate the proximity of the scrutinized vehicle until such time that the vehicle remains within the pre-set distance manually selected by the operator. A timer may be used to shut off the sensing activity of the sensor in the event of intentional herding of adjacent vehicles oftentimes encountered in heavy traffic.

6 Claims, 3 Drawing Figures

PASSING VEHICLE SIGNALLING APPARATUS

BACKGROUND OF THE INVENTION

1. The Field of the Invention

This invention relates to vehicle proximity sensing devices and more particularly to that class adapted to detect the range of vehicles beingpassed by equipment soley contained on board the passing vehicle. p 2. Description of the Prior Art The prior art abounds with various devices utilized to detect speed or distance of adjacent vehicles. U.S. Pat. No. 3,716,822 issued on Feb. 13, 1973 to Y. Tsuruta teaches a supersonic wave utilizing the Doppler effect to detect the relative speed of a preceding vehicle and to apply the braking system automatically when the preceding vehicle is being operated at substantially slower speeds than the scrutinizing vehicle.

U.S. Pat. No. 3,841,427 issued on Oct. 15, 1974 to V. DiVita discloses a distance measuring device, utilizing radar waves to sense the distance from a preceding vehicle and to automically activate the scrutinizing vehicle's braking system.

The aforementioned inventions suffer the common deficiency of failing to provide ranging dnd detecting information when passing an adjacent vehicle.

SUMMARY OF THE INVENTION

A primary object of the present invention is to provide distance related signals indicating the presence of a vehicle being passed within a predetermined danger zone.

Another object is to provide a pair of adjacent vehicle detectors, for mounting on opposite sides of the vehicle, each being capable of being selectively independently energized.

Still another object is to provide a visual signal indicating the presence of an adjacent vehicle in the danger zone.

Yet another object is to provide a manual adjustment means capable of shortening or lengthening the length of the danger zone.

A further object is to provide an automatic timer shut-off means to automatically de-energize an energized sensor head after a predetermined time period.

One of a pair of range detecting sensing heads are physically mounted to opposite sides of an equipment bearing or scrutinizing vehicle. Each sensor may be energized, to the exclusion of the other, by operating a control switch, which if desired, may be interconnected to a mechanical linkage coupled to the directional signal switch of the equipment bearing vehicle. Each sensor has a related danger zone length control device which effectively de-activates a visual alarm apparatus upon a scrutinized vehicle falling outside of the danger zone, or, alternatively preventing the energization of the alarm device when a scrutinized vehicle fails to enter the danger zone. A timer is placed in operation when the sensor energizing switch is operated limiting the length of time during which the energized sensing detector produces viable signals for the operation of the visual alarm device.

These objects as well as other objects of the present invention, will become more readily apparent after reading the following description of the accompanying drawings.

DESCRIPTION OF THE PREFERRED EMBODIMENT

The structure and method of fabrication of the present invention is applicable to an equipment bearing vehicle having a pair of ranging detectors, each of which is affixed to the frontmost side portions of the vehicle and having the active range sensing portions thereof directed towards the rear side portions of the vehicle. A control box is physically secured in the vehicle operator's compartment such that a visual alarm signal device is easily viewed by the operator, when illuminated. Each sensing head may be alternately selectively energized by the manual operation of a switch signifying a left side detection mode or a right side detection mode. The ranging information supplied by the energized sensor head is compared with one of two danger zone length determining controls such that when the actual range of the scrutinized adjacent vehicle is without the danger zone the alarm device is extinguished. A timer may extinguish the operation of the energized sensor head after a pre-set time period or the energized sensor head may be made inoperable upon the placement of the sensor head selector switch in a neutral, central off position.

Figure 1:
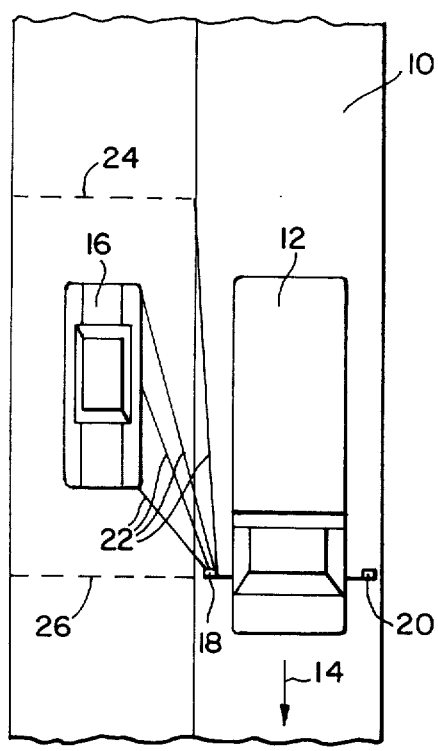
FIG. 1 illustrates an equipment bearing vehicle passing a scrutinized vehicle on a roadbed in plan view.

Now referring to the Figures, and more particularly to the embodiment illustrated in FIG. 1 showing a roadbed 10 upon which scrutinizing vehicle 12 is proceeding in the direction of arrow 14 whilst passing scrutinized vehicle 16. Sensor heads 18 and 20 are mounted outboard and on opposite sides from the frontmost portion of scrutinizing vehicle 12. Detecting rays 22, or either supersonic, radio or light wave form signal sensor 18 of the distance separating vehicle 16 from vehicle 12. Dotted line 24 and dotted line 26 are separated by a distance, herein referred to as the danger zone. Presence of vehicles within the danger zone alerts the operator of vehicle 12 to a dangerous condition of turning to the traffic lane which the danger zone is a part of. Alternatively sensor head 20 may search for vehicles, when energized, on the left hand side of vehicle 12 when and only when sensor head 18 is de-energized.

Figure 2:
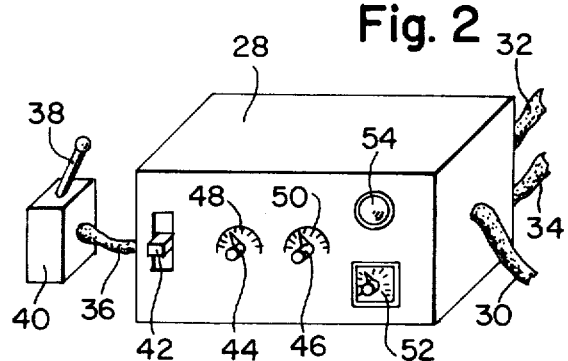
FIG. 2 is a perspective view of the control unit of the instant invention.

FIG. 2 illustrates a housing 28, mounted within the cab portion of vehicle 12, shown in FIG. 1. Cable 30 provides vehicle battery power to the electrical components located within housing 28 or remotely powered therefrom. Cable 32 provides electrical connections to the right hand sensor element 18, shown in FIG. 1. Cable 34 provides electrical connections to the left hand sensor element 20, shown in FIG. 1. Cable 36 provides electrical connections to a selector switch manually operated by lever 38 extending outwardly from selector switch housing 40. Lever 38, may if desired, be coupled to the turn signal selector lever, not shown, of scrutinizing vehicle 12, as shown in FIG. 1. On-off switch 42 disconnects vehicle battery power, applied through cable 30, to the electrical components within housing 28. Danger zone length adjustment knobs 44 and 46 are manually pre-set in accordance with scales 48 and 50 respectively, to adjust the length of the danger zone detectable by sensing elements 20 and 18 respectively. Timer 52 determines the length of time that either sensing head 18 and 20, as shown in FIG. 1, may remain energized for a maximum period of time, foreshortened only by the manipulation of lever 38 to a central, as opposed to a left hand or right hand position. Indicating lamp 54 becomes illuminated upon the presence of a vehicle, adjacent to the scrutinizing vehicle when in an activated danger zone, such activation being controlled by the position of lever 38 in either the left hand or right hand position thereof.

Figure 3:
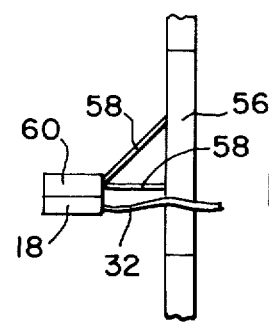
FIG. 3 is a plan view of a portion of the scrutinizing vehicle illustrated in FIG. 1.
Figure 4:
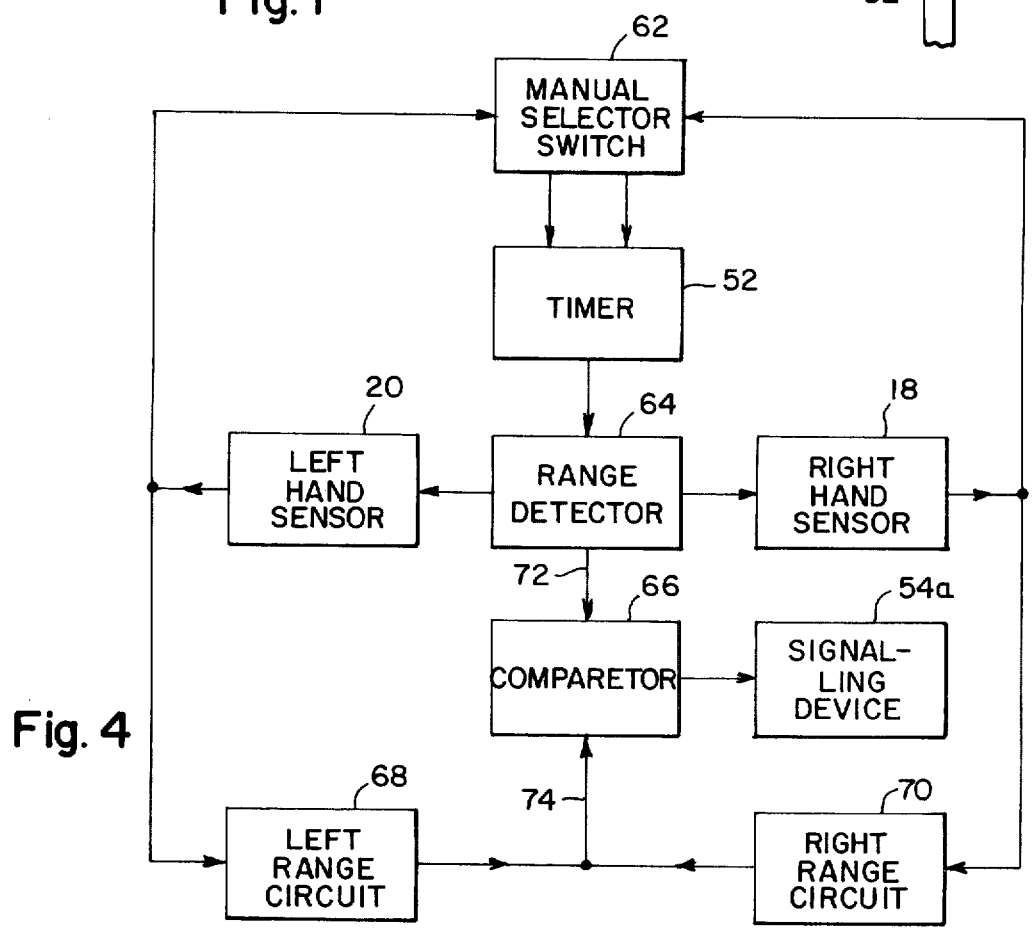
FIG. 4 is a block diagram view of the electrical components utilized in the instant invention.

FIG. 3 illustrates a portion 56 of the right hand side of scrutinizing vehicle 12, as shown in FIG. 1. Struts 58 support rear view mirror 60, to which sensing head 18 may be secured. Cable 32 provides electrical connections from sensing head 18 ot the interior portions of vehicle 12, as shown in FIG. 1. FIG. 4 illustrates right hand sensor 18 and left hand sensor 20, each being electrically connected to a manual selector switching device 62. The output signals from each sensor is selected by selector switch 62 and fed into timer 52, energized upon the operation of manual selector switch 62 in any position other than the central, neutral off position. Range detector 64, utilizes wave signals, projected from sensing elements 18 and 20. Return signals from any vehicles located within the danger zone, are symbolized, in conventional form, by a preferably analogue data signal fed 72 from the range detector 64 to the comparetor circuit 66. Left range circuit 68 and right range circuit 70 are independently energized when manual selector switch 62 is operated into a left hand or a right hand operating mode. A signal, corresponding to the desired length of danger zone lengths may then be fed into comparetor circuit 66. The comparetor circuit, in conventional fashion, provides an energizing signal to signalling device 54a, preferably a warning light, when the output signal appearing at line 74, representing thereby, the presence of a vehicle within the length selectively construed to be the danger zone.

One of the advantages is to provide distance related signals indicated the presence of a vehicle being passed within a predetermined danger zone.

Another advantage is to provide a pair of adjacent vehicle detectors, for mounting on opposite sides of the vehicle, each being capable of being selectively independently energized.

Still another advantage is to provide a visual signal indicating the presence of an adjacent vehicle in the danger zone.

Yet another advantage is to provide a manual adjustment means capable of shortening or lengthening the length of the danger zone.

A further advantage is to provide an automatic timer shut-off means to automatically de-energize sensor head after a pre-determined time period.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only the the appending claims.

I claim:

1. A passing vehicle signalling apparatus comprising at least one rearwardly directed range detecting apparatus affixed outwardly and along one side of a first vehicle, said range detecting apparatus for detecting the presence of a second vehicle adjacent to and disposed rearwardly a maximum distance from said range detecting apparatus when said second vehicle is disposed outwardly from said one side of said first vehicle, maximum distance adjustment means for manufally adjusting said maximum distance, alarm means for signalling the presence of said second vehicle within said maximum distance, switch means for selectively operating said range detecting apparatus, timing means for permitting said range detecting apparatus to remain operative for a pre-set maximum period of time, said pre-set maximum period of time being capable of being foreshortened when said switch means being manipulated to de-energize said range detecting apparatus.

2. A passing vehicle signalling apparatus as claimed is claim 1, wherein said maximum distance adjustment means comprises a manually adjustable analogue signal varying device for producing a pre-set adjustable analogue signal, a comparetor circuit for comparing the amplitude of said pre-set adjustable analogue signal and an output analogue signal from said range detecting apparatus, said output signal being in analogue ing form, said comparetor circuit producing an alarm output signal when said output signal is of lesser magnitude than said pre-set adjustable analogue signal.

3. A passing vehicle signalling apparatus as claimed in claim 2, wherein said alarm means comprises a lamp, said lamp being energized upon said comparetor circuit producing said alarm output signal.

4. A passing vehicle signalling apparatus as claimed in claim 3, wherein said switch means comprises a switch, said switch being operated by a lever said lever having a center off position and at least one side position for energizing said range detecting apparatus.

5. A passing vehicle signalling apparatus as claimed in claim 4, wherein said timing means comprises a manually adjustable pre-set timer, said timer being energized upon said lever being disposed into said at least one side position, said timer controlling the period of energization of said range detector apparatus.

6. A passing vehicle signalling apparatus as claimed in claim 5 further comprising another rearwardly directed range detecting apparatus affixed outwardly and along the other side of said first vehicle, said another range detecting apparatus for detecting the presence of a third vehicle adjacent to an disposed rearwardly another maximum distance from said another range detecting apparatus when said third vehicle is disposed outwardly from said other side of said first vehicle, said maximum distance adjustment means for independently varying said maximum distance and said another maximum distance, said alarm means including signalling the presence of said third vehicle within said another maximum distance said switch means selectively energizing either said range detecting apparatus or said another range detecting apparatus, said pre-set maximum period of time being capable of being foreshortened when said switch means being manipulated to de-energize said another range detecting apparatus, said maximum distance adjustment means having another manually adjustable analogue signal varying device for producing another pre-set adjustable analogue signal, said comparetor circuit for selectively comparing said another amplitude of said another pre-set adjustable analogue signal, an output signal from said another range detecting apparatus, said switch means having two oppositely directed operating lever positions, said two oppositely directed operating lever positions being disposed outwardly from said center off position, said range detecting apparatus and said manually adjustable analogue signal varying device and said pre-set timer being energized when said lever is manipulated into one of said two oppositely directed operating lever positions, said another range detecting apparatus and said another manually adjustable signal varying device and said pre-set timer being energized when said lever is manipulated into the other of said two oppositely directed operating lever positions.

* * * * *